United States Patent [19]
Dietz et al.

[11] Patent Number: 4,799,140
[45] Date of Patent: Jan. 17, 1989

[54] MAJORITY VOTE SEQUENCER

[75] Inventors: Ronald P. Dietz; Jeffrey D. Johnson, both of Littleton, Colo.

[73] Assignee: Orbital Sciences Corporation II, Fairfax, Va.

[21] Appl. No.: 837,059

[22] Filed: Mar. 6, 1986

[51] Int. Cl.$^4$ .............................................. G06F 11/08
[52] U.S. Cl. ...................................... 364/140; 371/36; 364/141; 364/136; 364/200
[58] Field of Search ............... 364/140, 141, 138, 136, 364/200 MS File; 371/36

[56] References Cited

U.S. PATENT DOCUMENTS

| | | | |
|---|---|---|---|
| 2,651,458 | 9/1953 | Bennett et al. | 364/140 |
| 4,342,083 | 7/1982 | Freedman et al. | 364/200 |
| 4,484,330 | 11/1984 | Moy | 364/36 |

Primary Examiner—Jerry Smith
Assistant Examiner—Steve Long Hoang
Attorney, Agent, or Firm—Kirkland & Ellis

[57] ABSTRACT

An electronic sequencing system comprised of two groups of three identically operating sequencers and circuitry that combines the outputs of these sequencers so that accurate, flexible and reliable sequencing of devices is obtained. Each sequencer is comprised of a microprocessor, memory, and peripheral circuits. The individual sequencer outputs are combined such that at least one of the corresponding system outputs will activate the device to be sequenced if at least two of three corresponding individual sequencer outputs signal that the device should be activated. Additional reliability is obtained by combining the outputs of each group of the identically operating sequencers to control the devices to be sequenced. Reset circuitry is also provided to simultaneously reset the sequencers and to prevent premature outputs from activating the devices to be sequenced.

19 Claims, 3 Drawing Sheets

MAJORITY VOTE SEQUENCER

BACKGROUND OF THE INVENTION

1. Field of the Invention

This invention relates broadly to the field of event sequencers and in particular, relates to an electronic sequencing system that combines the outputs of a plurality of identically operating redundant sequencers to provide a highly reliable sequencing system for demanding applications such as in space vehicles.

2. Brief Description of the Prior Art

Sequencers are used, for example, to control the timing and sequence of events in connection with the launching or in-flight maneuvering of spacecraft. Such sequencers for applications in spacecraft traditionally have been mechanical, utilizing motor driven gears and cams in order to provide the necessary high degree of reliability. See U.S. Pat. No. 4,018,092, issued to Fletcher, for a "Mechanical Sequencer." Although reliable, such sequencers have important disadvantages when used in spacecraft. First, mechanical sequencers have a limited timing accuracy. Second, such sequencers are often heavy and bulky and thus reduce the amount of other productive equipment that can be carried by a spacecraft. Third, such sequencers are inflexible. A change in the sequence requires tedious and time-consuming modifications of gears and cams.

Accordingly, it is an object of the invention to provide a sequencer that has the capability to time events in time increments of minimal size.

It is also an object of the invention to provide a sequencer which possesses a high degree of reliability for applications such as use in space.

It is a further object of the present invention to provide a flexible apparatus for sequencing so that a change in the sequence can be accomplished easily on the ground or in space by electrical commands without modifying mechanical components.

It is another object of this invention to provide an apparatus that is easy to maintain and repair.

It is a further object of the invention to provide a sequencer that has weight, volume and safety characteristics that permit its use in space.

SUMMARY OF THE INVENTION

The above and other objects of the invention are achieved by a microprocessor-based electronic sequencing system which increases timing accuracy and achieves high reliability by combining the outputs of a plurality of identically operating sequencers. This sequencing system is ideally suited for use in space because of its low weight, small volume and flexibility as compared with mechanical sequencers. Flexibility is greatly increased because a change in the timing or sequence can be accomplished by changing the sequence data in the sequencing system's memory without requiring the modification or substitution of mechanical or electrical components, as is required with mechanical sequencers. Moreover, the present invention can be manufactured in a modular manner to facilitate maintenance and repair.

The invention combines the outputs of a plurality of identically operating redundant sequencers by means of majority vote combination circuitry. In the preferred embodiment of the sequencing system, six sequencers are arranged in two independent groups with three identically operating sequencers in each group. Each sequencer is comprised of a microprocessor and peripheral circuits which include thirty-two output signal lines that are combined to activate and deactivate by selectively connecting a power supply to the devices to be sequenced. Signal lines are provided over which each of the sequencers exchanges control signals with external devices. Each sequencer also contains cascaded reset circuitry in order to achieve simultaneous initiation of the microprocessors and also to prevent output signals from prematurely reaching the devices to be sequenced. Further, connections for redundant power supplies are provided such that if one power supply fails, at least two of the three sequencers in each group will continue to operate properly.

The sequencing system includes separate majority vote combination circuitry for each group of sequencers, each of which receives each of the corresponding votes from each of the three sequencers in a group and for each set of corresponding votes generates three "partial votes" (i.e., A & B, A & C, and B & C). In the preferred embodiment, the sequencer votes are either a logic one (a "yes" vote), or a logic zero (a "no" vote). Also, in the preferred embodiment, the partial votes are signals which activate (set or reset) relays ("yes" partial votes), as appropriate, and deactivate relays ("no" partial votes), as appropriate. These relays are used to selectively apply power to the devices to be sequenced. If all three of the corresponding votes of the sequencers are yes, the majority vote combination circuitry outputs three corresponding partial votes that are yes. If only two of the three corresponding votes of the sequencers are yes, such as might be the case if one of the sequencers failed to operate properly, then only one of the corresponding partial votes will be yes. In both cases, the relay applying power to the device to be sequenced would be activated, as only one yes partial vote is required to activate the relay. If fewer than two of the corresponding votes of the sequencers are yes, then all three of the corresponding partial votes will be no and the relay will not be activated. Thus, if at least two of the corresponding votes are yes, the corresponding relay will be activated and power will be applied to the device connected to that relay.

In the event of an erroneous no vote, such as if one of the sequencers failed to operate properly, an analysis of the partial votes will indicate whether the corresponding vote of a particular sequencer was yes or no. Thus, it can be determined which of the three sequencers generated the erroneous no vote, thereby facilitating repair and replacement.

Since there are two independent groups of sequencers in the preferred embodiment, with each group producing thirty-two sets of three partial votes, the invention provides a total of sixty-four sets of three partial votes, which can selectively activate up to sixty-four devices such as control relays. If additional reliability is desired, the partial votes of the two independent groups can be externally combined to control the device to be sequenced. For example, the partial votes can be combined such that at least two of the three corresponding votes of both of the groups must be yes before the relay applying power to the device to be sequenced is activated.

BRIEF DESCRIPTION OF THE DRAWINGS

The above and other objects, features and advantages of this invention may be understood best and will become more apparent from a consideration of the following detailed description of the preferred embodiment made with reference to the accompanying drawings, in which.

DESCRIPTION OF THE PREFERRED EMBODIMENT

Figure 1:
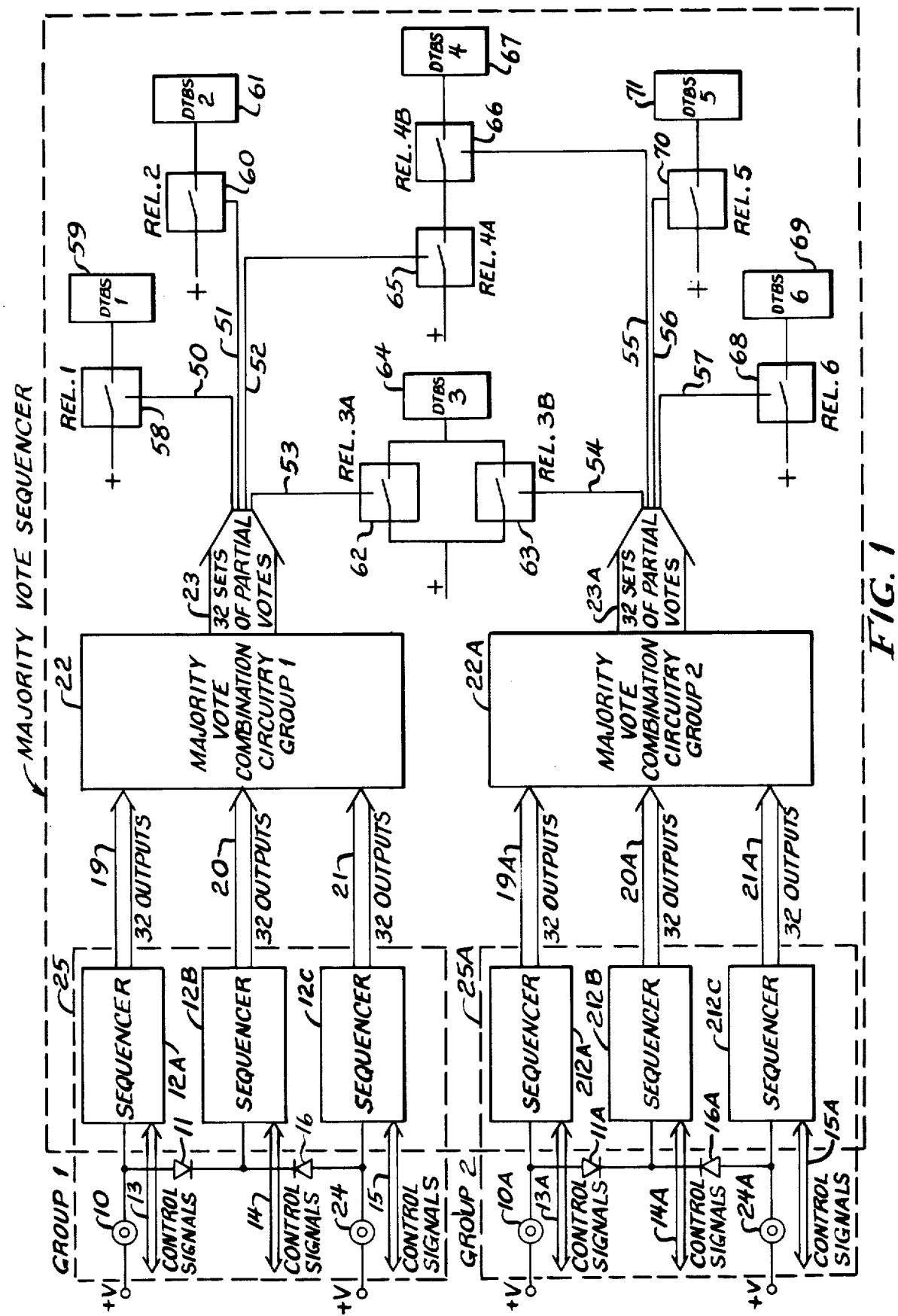
FIG. 1 is a block diagram of the sequencing system of the preferred embodiment of the present invention.

FIG. 1 illustrates two independent but analogous groups of sequencers 25 and 25A. First sequencer group 25 contains three identically operating sequencers 12A, 12B and 12C. Power input 10 provides power directly to sequencer 12A and through diode 11 to sequencer 12B. Likewise, power input 24 provides power directly to sequencer 12C and through diode 16 to sequencer 12B. Each of the external power sources (not shown in FIG. 1) connected to power inputs 10 and 24 is capable of providing power sufficient for two of sequencers 12A, 12B and 12C. This configuration ensures that if either of the external power sources connected to power inputs 10 or 24 fails, two of sequencers 12A, 12B and 12C will receive power so as to permit majority voting to occur even though a single power source has failed. In alternative embodiments, diodes 11 and 16 are positioned outside first sequencer group 25 and are connected to the power sources (not shown) that connect to power inputs 10 and 24. An additional power input (not shown) is then provided to connect the cathodes of diodes 11 and 16 to sequencer 12B.

As further illustrated in FIG. 1, sequencers 12A, 12B and 12C of first sequencer group 25 exchange control signals 13, 14 and 15 with external devices (not shown). Each of sequencers 12A, 12B and 12C has a set of output lines 19, 20 and 21, with each set containing thirty-two lines, where corresponding lines from the three sequencers are connected to corresponding circuits in majority vote combination circuitry 22.

The signals on each of the thirty-two output lines from each of sequencers 12A, 12B and 12C is either a logic one, referred to as a "yes vote," or a logic zero, referred to as a "no vote." When all three of sequencers 12A, 12B and 12C are operating properly the votes on each of the corresponding output lines of the respective sequencers will be the same at any given point in time. These votes are inputs to majority vote combination circuitry 22 of first sequencer group 25.

Majority vote combination circuitry 22 combines the thirty-two votes from each sequencer and generates thirty-two sets of three signals, which are illustrated in FIG. 1 as output lines 23. The signals an output lines 23 are referred to as "partial votes". As more fully described below in connection with FIG. 2, each partial vote is obtained by performing the equivalent of a logical AND operation on the corresponding outputs of two of the three sequencers in first sequencer group 25. If all three of the corresponding votes are yes, then all three of the corresponding partial votes will be yes. If one vote is no, then only one of the three corresponding partial votes will be yes. However, if only one of the three corresponding votes is yes and two are no, then all three of the corresponding partial votes will be no. In the preferred embodiment, a "yes" partial vote will activate a relay connected to the output line, and a "no" partial vote will not activate a relay connected to the output line.

Second sequencer group 25A shown in FIG. 1 is independent of the first group 25, but functions in a manner entirely analogous to first sequencer group 25 described above. Second sequencer group 25A is comprised of power inputs 10A and 24A, diodes 11A and 16A and sequencers 212A, 212B and 212C. Sequencers 212A, 212B and 212C exchange control signals 13A, 14A and 15A with external devices (not shown). Output lines 19A, 20A and 21A are connected to majority vote combination circuitry 22A which generates thirty-two sets of three partial votes on output lines 23A. In the preferred embodiment, up to sixty-four devices can be majority voted and sequenced from the total partial vote outputs of first sequencer group 25 and second sequencer group 25A.

As an example, FIG. 1 includes several relays that are utilized to selectively connect a power source (illustrated in FIG. 1 as "+" to an illustrative set of devices to be sequenced. Sets of partial votes from partial vote output lines 23 and 23A are connected to relays (58, 60, 62, 63, 65, 66, 68 and 70 of FIG. 1) that selectively apply power to the devices to be sequenced (59, 61, 64, 67, 69 and 71 of FIG. 1), an example of such a device being a fuel valve in a rocket engine. In the preferred embodiment, each of the three corresponding output lines comprising the set of partial votes for each of the 32 sets of partial votes is connected to the same relay coil. If two or more of the corresponding votes of the sequencers in a group of sequencers are yes, at least one corresponding partial vote will be yes and the yes partial vote will activate the relay thereby applying power to the device to be sequenced. As more fully described below, diodes 270A, 270B and 270C illustrated in FIG. 2 prevent interaction among the corresponding partial votes, which are connected to the same relay coil. In other embodiments, the three corresponding output lines of a set of partial votes are connected to three separate relay coils (not shown), with the relay contacts of the three corresponding relays arranged in parallel so that if at least one partial vote is yes, then at least one relay will be activated and power will thereby be applied to the device to be sequenced.

FIG. 1 illustrates four majority voted outputs 50, 51, 52, 53, 54, 55, 56 and 57 from each of first and second sequencer groups 25 and 25A combined to selectively apply power to six devices 59, 61, 64, 67, 71 and 69 through relays 58, 60, 62, 63, 65, 66, 68 and 70. Each of majority voted output lines 50-57 consists of a set of three corresponding partial votes. Majority voted output line 50 of first sequencer group 25 is connected to relay 58. If at least one of the three partial votes comprising majority voted output line 50 is yes, then relay 58 will be activated, and power will be applied to device 59. Similarly, if at least one of the three partial votes comprising majority voted output line 51 is yes, then relay 60 will be activated and power will be applied to device 61. Majority voted output lines 56 and 57, relays 68 and 70 and devices 69 and 71 all of second sequencer group 25A operate in a similar manner.

The independent operation of first and second sequencer groups 25 and 25A also allows majority voted output lines from first and second sequencer groups 25 and 25A to be combined for additional reliability. For example, majority voted output line 53 consisting of a set of three corresponding partial votes from first sequencer group 25 is connected to relay 62. Majority voted output line 54 consisting of a set of three corresponding partial votes from second sequencer group 25A is connected to relay 63. The contacts of relay 63 are in parallel with the contacts of relay 62. In this arrangement, which functions as a logical OR operation, power will be applied to device 64 if at least one partial vote from either of majority voted output line 53 or 54 is yes. This arrangement provides an extra level of redundancy in that power will be applied to device 64 at the appropriate time if at least two sequencers in either the first or second sequencer group 25 or 25A operate properly.

Similarly, majority voted output line 52 from first sequencer group 25 is connected to relay 65, and majority voted output line 55 from second sequencer group 25A is connected to relay 66. The contacts of relay 65 are in series with the contacts of relay 66. In this arrangement, which functions as a logical AND operation, the device 67 will be activated if at least one partial vote from each of majority voted output lines 52 and 55 is yes. This arrangement provides an extra level of redundancy in that power will be applied to device 67 at the appropriate time only if at least two sequencers in both of first and second sequencer groups 25 and 25A operate properly. Such a combination, as well as the logical OR connection described above, increases reliability as desired, but does so at the expense of the total number of devices that can be controlled.

In other embodiments of the present invention, any desired number of sequencers is included in each group, and any desired number of groups of sequencers is included in the sequencing system. The outputs from the sequencers and from the groups of sequencers are utilized to apply power to devices to be sequenced by circuitry in a manner analogous to that described above for the preferred embodiment. For example, in other embodiments there are eight sequencers per group, and the relay applying power to the device to be sequenced is activated if at least five of the corresponding votes are yes. In still other embodiments, a "super-majority" of corresponding votes must be yes before power is applied to the device to be sequenced. For example, in other embodiments there are six sequencers per group, and the relay applying power to the device to be sequenced is activated only if at least five of the corresponding votes are yes. The present invention includes any such desired number of sequencers per group and any such super-majority voting level.

Figure 2:
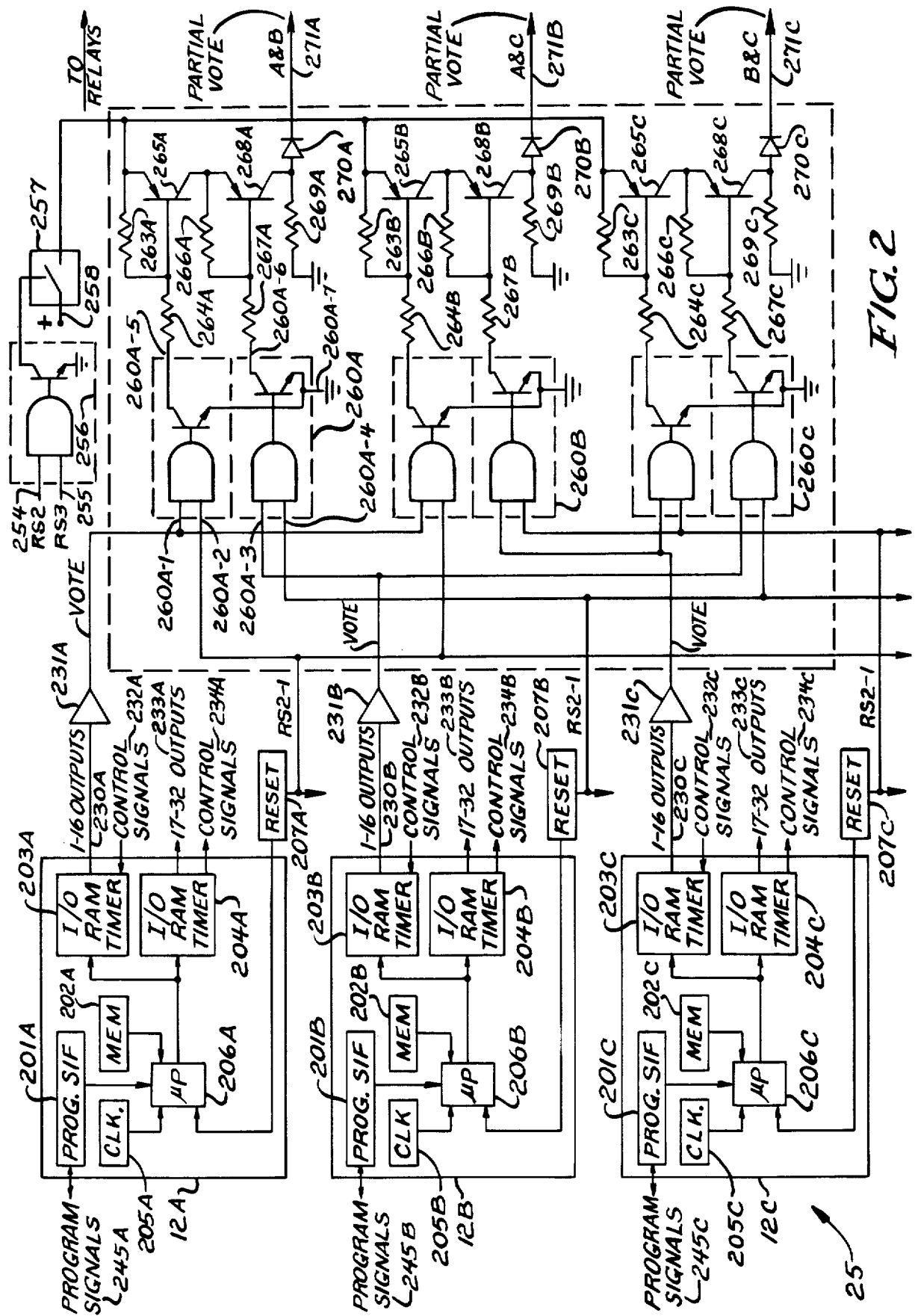
FIG. 2 is a diagram illustrating one group of sequencers and the associated majority vote combination circuitry of the present invention.

FIG. 2 illustrates in greater detail identical sequencers 12A, 12B and 12C of first sequencer group 25. Sequencer 12A includes a microprocessor 206A, clock reference 205A, cascaded reset circuitry 207A, serial interface 201A, memory 202A and peripheral circuits 203A and 204A (labeled as I/O RAM Timer in FIG. 2). Memory 202A includes an electrically alterable read only memory (EAROM) and a programmable read only memory (PROM). Each peripheral circuit 203A and 204A includes input/output (I/O) ports, random access memory (RAM), and a programmable timer/counter. For clarity, other conventional elements of microprocessor systems such as power supplies and address decoding circuitry are not shown.

The operation of each of sequencers 12A, 12B and 12C is identical; therefore, only sequencer 12A will be further described. Clock reference 205A provides the time base for the microprocessor 206A. Clock reference 205A is any suitably accurate frequency source, and in the preferred embodiment comprises a crystal controlled oscillator of the desired frequency to ensure accurate sequencing. Serial interface 201A is used to input from external devices (not shown) the sequence program, which is illustrated as program signals 245A in FIG. 2. Execution of the sequence program causes output signals (i.e., yes and no votes) to be output on the appropriate output lines, illustrated as 230A and 233A in FIG. 2, during the sequence. The sequence program is stored by microprocessor 206A in the EAROM included in memory 202A, as described below. In other embodiments microprocessor 206A also exchanges control signals with external devices (not shown) through serial interface 201A. For example, data can be input and output via serial interface 201A for purposes of testing sequencer 12A. Peripheral circuits 203A and 204A are configurable input/output circuits (which also include RAM and a timer/counter) of a type known in the art. The I/O lines of peripheral circuits 203A and 204A are configured to be either an input line or an output line as determined by receipt of a digital word by each of peripheral circuits 203A and 204A. In the preferred embodiment, the configuring digital word is received by peripheral circuits 203A and 204A from microprocessor 206A during execution of the initialization program. Sixteen of the I/O lines of peripheral circuit 203A are configured as output lines for sixteen votes, as illustrated by outputs 230A of FIG. 2. Similarly, sixteen of the I/O lines of peripheral circuit 204A are configured as output lines for an additional sixteen votes, as illustrated by outputs 233A of FIG. 2. This gives a total of thirty two output lines for thirty two votes from sequencer 12A. In the preferred embodiment, the remaining I/O ports of peripheral circuit 203A are configured to receive control signals 232A and the remaining I/O ports of peripheral circuit 204A are configured to send control signals 234A. Additional control signals 232A and 234A that can be exchanged with external devices (not shown) through peripheral circuits 203A and 204A include, for example, signals to monitor the operation of sequencer 12A and signals to suspend operation of sequencer 12A in the event a delay in further execution of the sequence is desired.

Reset circuitry 207A, more fully described below in connection with FIG. 3, permits external devices (not shown) to reset sequencer 12A by resetting microprocessor 206A. Also as more fully described below, reset circuitry 207A prevents partial vote outputs from prematurely reaching the devices to be sequenced.

The EAROM included in memory 202A of sequencer 12A of FIG. 2 contains the sequence program and timing data. The sequence program and timing data are received by microprocessor 206A through serial interface 201A from external devices (not shown) and stored in the EAROM of memory 202A. The loading of programs and data into memory such as memory 202A through a serial interface such as serial interface 201A is known in the art. Additionally, a test program and test data can initially be stored in the EAROM of memory 202A and executed by microprocessor 206A for diagnostic purposes prior to actual operation of sequencer 12A. The electrically alterable feature of the EAROM is utilized to modify the EAROM contents to change the output sequence of sequencer 12A. This feature provides flexibility not found in mechanical sequencers.

The PROM included in memory 202A contains the initialization program for microprocessor 206A and also contains the program that directs the modification of the EAROM contents. The loading of programs into the PROM of memory 202A is accomplished by conventional means prior to operation of the present invention. In other embodiments, the PROM contains programs which provide self-diagnostic testing of the sequencer 12A, and programs that allow external devices to monitor the status of sequencer 12A.

The RAM included in peripheral circuits 203A and 204A (referred to as I/O RAM Timers in FIG. 2) provides storage for stack pointer addresses and also provides scratch pad memory used by microprocessor 206A.

Each of peripheral circuits 203A and 204A includes a programmable timer/counter (not explicitly show) that generates timing signals by decrementing a programmable counter (not shown) that is internal to each of peripheral circuits 203A and 204A. The counter is programmed by receipt of an initial digital count value from the microprocessor 206A, and the decrement rate is determined by a clock output signal of microprocessor 206A. As is known in the art, programmable timer/counters of the type included in peripheral circuits 203A and 204A generate digital signals at periodic intervals determined by the initial counter value and the frequency of the counter/timer decrement signal. Also as known in the art, such periodic digital signals can be utilized to generate what are known as interrupts. Periodic interrupts are known in the art to be useful for interacting with and influencing the execution of programs by microprocessor 206A. In the preferred embodiment, the programmable timers are conventionally utilized to initiate execution of the program in memory 202A that, for example, controls the output of the votes on output lines 230A and 233A.

In the preferred embodiment, and as described above, peripheral circuits 203A and 204A include I/O ports that are configured to exchange control signals with external devices and to output the votes 1-16 (from peripheral circuit 203A, and illustrated by outputs 203A) and votes 17-32 (from peripheral circuit 204A, and illustrated by outputs 233A) of sequencer 12A. In alternative embodiments, peripheral circuits 203A and 204A are modified, one of them omitted, or additional such peripheral circuits included to output a lesser or greater number of votes from sequencer 12A. In still other embodiments, separate input circuits, separate output circuits, separate RAM circuits and separate programmable timer/counter circuits could be utilized instead of using peripheral circuit 203A to achieve the desired functions. Peripheral circuit 203A is used instead of separate circuits because the I/O circuits, the RAM and the timer/counter are included within one integrated circuit, thereby reducing the cost and complexity of the present invention.

The preferred embodiment of the present invention uses a number of standard electronic components. In other embodiments, a variety of standard and custom circuits is used to accomplish the functions of the preferred embodiment. As an example, in other embodiments PROM can be substituted for EAROM or vice versa, and the initialization program and the sequence data and program can be stored either in a common memory or in separate memories. In still other embodiments, sequencer 12A operates with a sequence program that does not require scratch pad memory, and the RAM included in peripheral circuits 203A and 204A is not needed.

As previously mentioned, sequencers 12B and 12C shown in FIG. 2 are identical to sequencer 12A. The programs and data stored in memory 202B and 202C of sequencers 12B and 12C are also identical to the programs and data contained in memory 202A of sequencer 12A. Clock references 205B and 205C of sequencers 12B and 12C provide the same, precise pre-selected frequency as clock reference 205A of sequencer 12A.

Peripheral circuits 203B and 204B of sequencer 12B and 203C and 204C of sequencer 12C are each configured as described above for peripheral circuits 203A and 204A to output thirty-two votes on thirty-two separate output lines illustrated as output lines 230B and 233B, and, 230C and 233C, respectively. Each of the corresponding votes of sequencers 12A, 12B and 12C controls, as described above in reference to FIG. 1, a common device to be sequenced. The thirty-two votes of each of sequencers 12A, 12B and 12C are presented to a plurality of buffer amplifiers 231A, 231B and 231C, as illustrated in FIG. 2. It should be understood that each of the thirty two output lines from each of sequencers 12A, 12B and 12C are connected to a separate buffer amplifier. For clarity, only three of the ninety-six total buffer amplifiers are shown in FIG. 2.

The outputs of illustrative buffer amplifiers 231A, 231B and 231C are presented to open collector logic gates 260A, 260B and 260C, respectively, which comprise a portion of majority vote combination circuitry 22 of FIG. 1. Open collector logic gates 260A, 260B and 260C are dual open collector AND gates of a type known in the art. In the preferred embodiment, there are ninety-six such open collector logic gates arranged in thirty-two groups of three. Each group of three open collector logic gates corresponds to one of the thirty-two corresponding votes of the sequencers 12A, 12B and 12C (the output line from each buffer amplifies corresponds to only a single vote). Although only one group of three logic gates 260A, 260B and 260C is shown in FIG. 2, it should be understood that majority vote combination circuitry 22 includes thirty-two such groups.

As illustrated in FIG. 2, open collector logic gate 260A receives a single, corresponding vote from each of sequencers 12A and 12B, open collector logic gate 260B receives a single, corresponding vote from each of sequencers 12A and 12C, and open collector logic gate 260C receives a single, corresponding vote from each of sequencers 12B and 12C. Also as illustrated in FIG. 2, RS2-1 reset signals from each of cascaded reset circuits 207A, 207B and 207C are applied to open collector logic gates 260A, 260B and 260C. Because the operation of open collector logic gate 260A is analogous to that of open collector logic gates 260B and 260C, only the operation of open collector logic gate 260A will be further described.

A single corresponding vote from sequencer 12A is presented to input 260A1 of open collector logic gate 260A from buffer amplifier 231A. Similarly, a single corresponding vote from sequencer 12B is presented to input 260A3 from buffer amplifier 231B. The RS2-1 reset signal from cascaded reset circuitry 207A is presented to input 260A2 and the RS2-1 reset signal from cascaded reset circuitry 207B is presented to input 260A4.

As illustrated in FIG. 2, the emitters, illustrated as output 260A7, of the two output transistors in open collector logic gate 260A are connected to ground potential. As is known in the art, output 260A5 is brought to near ground potential when inputs 260A1 and 260A2 are a logic high. If either of input 260A1 or input 260A2 is a logic low, output 260A5 presents a high impedance to ground potential. Similarly, output 260A6 is brought to near ground potential when inputs 260A3 and 260A4 are a logic high, and if either of inputs 260A3 or 260A4 is a logic low, output 260A6 presents a high impedance to ground potential.

Resistors 263A, 264A, 266A, 267A and 269A and PNP transistors 265A and 268A connected to outputs 260A5 and 260A6 of open collector logic gate 260A comprise a conventional switching network. These resistors and transistors operate as known in the art such that relay activating voltage 258 is presented to the diode 270A of partial vote output line 271A when inputs 260A1-260A4 of open collector logic gates 260A are each a logic high. Gates 260B and 260C and their associated resistors and PNP transistors function in an analogous manner.

Relay activating power source 258 (shown as "+" in FIG. 2) is switched to the resistor and transistor networks described above by activation of relay 257. Although not explicitly shown, one side of the coil of relay 257 is connected to a positive voltage such that relay 257 is activated when the output of open collector logic gate 256 is a low impedance to ground potential (i.e., when the RS2 and RS3 reset signals at inputs 254 and 255, respectively, of open collector logic gate 256 are both logic high). Thus, the power source (such as power source 258) that is selectively applied to the devices to implement the desired sequence is not presented to the resistor and transistor switching networks (described above) until after the RS2 and RS3 reset signals are both a logic high signal level (the timing of RS2 and RS3 is described below in reference to FIG. 3).

In the preferred embodiment, there is one such open collector logic gate 256, one such relay 257 and one such relay activating power source 258 for each of sequencers 12A, 12B and 12C, although for clarity only one set of these elements is shown in FIG. 2. Each of the power sources (such as power source 258) provide power to one third of the resistor and transistor switching networks that are connected to each of the ninety-six total dual open collector logic gates (such as open collector logic gates 260A, 260B and 260C shown in FIG. 2). The RS2 and RS3 reset signals at inputs 254 and 255, respectively, of open collector logic gate 256 are generated, for example, by cascaded reset circuit 207A by sequencer 12A. The RS2 and RS3 reset signals generated by cascaded reset circuits 207B and 207C of sequencers 12B and 12C, respectively, are inputs to two additional open collector logic gates (not shown) in a manner analogous to that described above for open collector logic gate 256.

Partial vote output lines 271A, 271B and 271C are each connected to the same relay coil, such a relay coil being, for example, in relay 58 of FIG. 1. Diodes 270A, 270B and 270C prevent interaction of the signals on partial vote output lines 271A, 271B and 271C.

Figure 3:
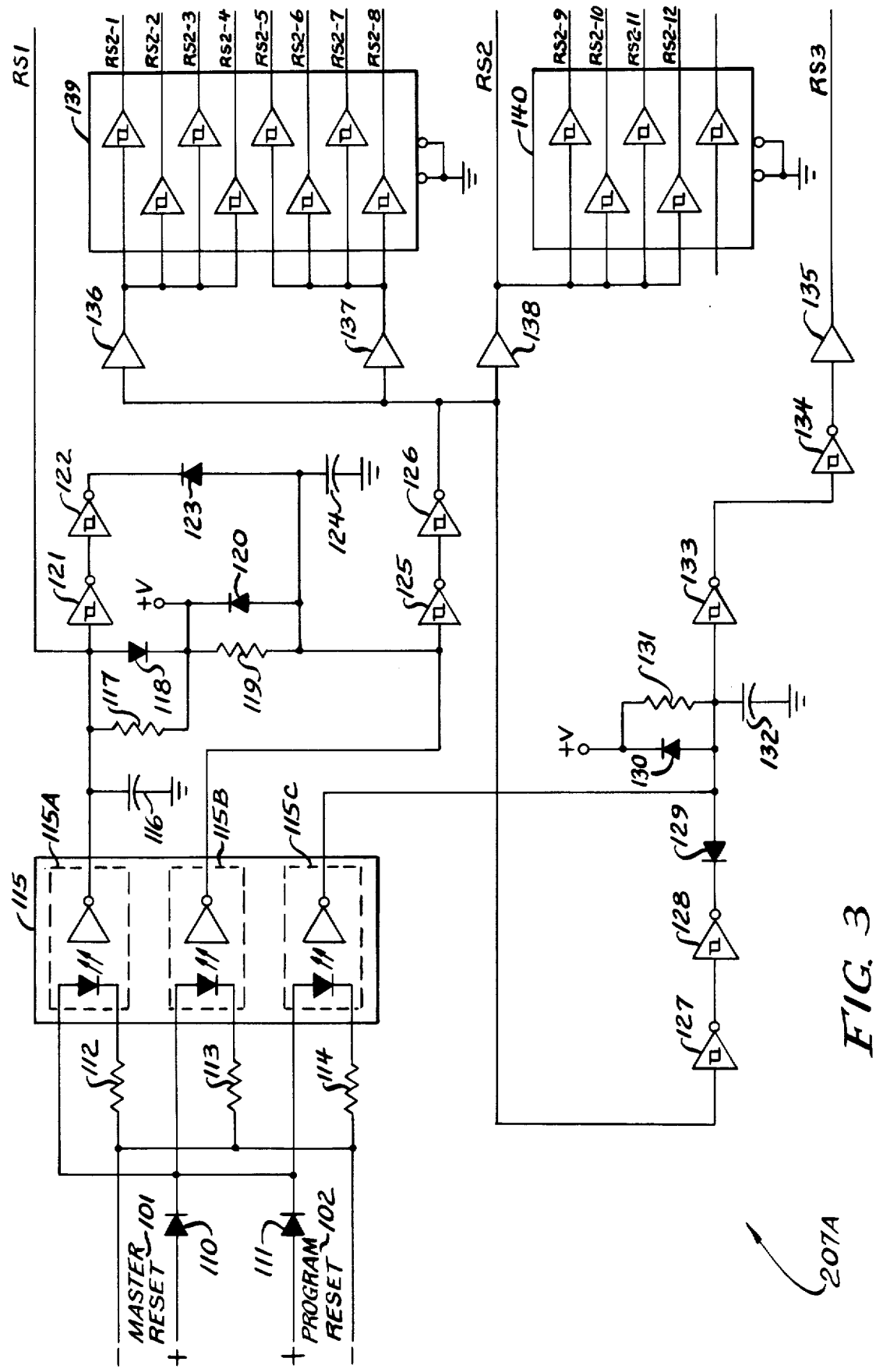
FIG. 3 is a diagram illustrating one of the cascaded reset circuits for one of the sequencers of the present invention.

FIG. 3 illustrates cascaded reset circuitry 207A of sequencer 12A of the present invention. Master Reset signal 101 and Program Reset signal 102 are reset signals from external devices (not shown). A positive Master Reset signal 101 induces current flow through diode 110, through the input photo-diode of unit 115A of opto-isolator 115, and through resistor 112. A positive Master Reset signal 101 similarly induces current flow through the input photo-diode of unit 115B and unit 115C of opto-isolator 115 and through resistors 113 and 114. Diode 111 isolates the Master Reset signal line 101 from the Program Reset signal line 102. A positive Program Reset signal 102 similarly induces current flow through diode 111, input photo-diodes of units 115A, 115B and 115C of opto-isolator 115, and through resistors 112, 113 and 114. Diode 110 isolates the Program Reset signal line 102 from the Master Reset signal line 101.

When sufficient current is flowing through the respective input photo-diodes of units 115A, 115B and 115C, the outputs of opto-isolator 115 are a low impedance to ground potential, thereby discharging capacitors 116, 124 and 132. When sufficient current is not flowing, the outputs of opto-isolator 115 are a high impedance to ground potential. Opto-isolator 115 enables the circuitry connected to the output of the opto-isolator to operate on a power supply that is separate and independent from the power supply of the external devices (not shown) that generate Master Reset signal 101 and Program Reset signal 102. This isolates the circuitry connected to the output of opto-isolator 115 from noise that may be present on the input signals and input circuitry power supplies of the external devices, yet allows the external devices to reset the sequencers of the present inventions.

When the output of the unit 115A of opto-isolator 115 goes from a low impedance to ground potential to a high impedance to ground potential, capacitor 116 begins to charge and its voltage begins to increase towards the voltage of the power supply (illustrated as +V in FIG. 3). Because the output impedance of unit 115A of opto-isolator 115 is large compared to the impedance of resistor 117, the charging time of capacitor 116 is determined primarily by the values of resistor 117 and capacitor 116. The charging time is determined by the well-known RC time constant. Similarly, the charging time of capacitor 124 is determined primarily by the values of resistor 119 and capacitor 124, and the charging time of capacitor 132 is determined primarily by the values of resistor 131 and capacitor 132. When power is removed, diodes 118, 120 and 130 discharge capacitors 116, 124 and 132, respectively.

When the voltage of capacitor 116 is below the positive-going threshold of Schmitt inverter 121, the output of Schmitt inverter 121 is a logic "one", or a high potential, and the output of Schmitt inverter 122 is a logic "zero", or a low potential. The low potential on the output of Schmitt inverter 122 forward biases diode 123 and prevents the charging of capacitor 124. When the voltage of capacitor 116 reaches the positive-going threshold of Schmitt inverter 121, the output of Schmitt inverter 121 changes from a high to a low potential which induces a change from a low to a high potential in the output of Schmitt inverter 122. Diode 123 is now reverse biased, and capacitor 124 begins to charge. Thus, a delay is created between the time that capacitor 116 begins to charge and the time that capacitor 124 begins the charge.

A similar delay is created between the time that capacitor 124 begins to charge and the time that capacitor 132 begins to charge. Capacitor 132 is prevented from charging by Schmitt inverters 125, 126, 127 and 128 and diode 129 until the voltage on capacitor 124 reaches the positive-going threshold of Schmitt inverter 125. Thus, the charging of capacitors 116, 124 and 132 occurs sequentially. Schmitt inverters 121, 125 and 133 generate sharp rising edges from the exponential voltage increases of capacitors 116, 124 and 132, respectively. The hysteresis in the switching thresholds of the Schmitt inverters reduces the likelihood of "glitches" and undefined logic states in the reset signals. Buffer amplifiers 136 and 137 provide drive capability for the inputs of Schmitt buffer 139. Buffer amplifier 138 provides drive capability for the inputs of Schmitt buffer 140 and for the RS2 reset signal line. Multiple RS2 reset signal lines (RS2, RS2-1 through RS2-12) are provided to increase the total fan-out of the reset lines. RS2-1 through RS2-12 are connected to the ninety-six open collector logic gates of the present invention, such as 260A, 260B and 260C described above in reference to FIG. 2. Buffer amplifier 135 provides drive capability for the RS3 reset signal line.

The sequencing system of the present invention operates as follows. Cascaded reset circuits 207A, 207B and 207C of FIG. 2 (cascaded reset circuit 207A is also illustrated in FIG. 3) generate reset signals RS1, RS2, RS2-2 through RS2-12 upon power-up of the invention. Capacitor 116 begins to charge through resistor 117. Reset signal RS1 is the voltage on capacitor 116 and this voltage resets the sequencer microprocessor when it reaches the reset level threshold of the microprocessor, as illustrated by reset circuit 207A of sequencer 12A in FIG. 2. Because the corresponding capacitors and resistors of both groups of sequencers have identical values, the RS1 reset signals, for example, of cascaded reset circuits 207A, 207B and 207C, provide nearly simultaneous resetting of the microprocessors in both first and second sequencer groups 25 and 25A. As is known in the art, microprocessors begin execution of an initialization program at an address preselected by the microprocessor manufacturer in response to a transition from a logic low signal to a logic high signal at the reset pin of the microprocessor.

The voltage on capacitor 116 continues its increase until it reaches the positive-going threshold of Schmitt inverter 121, at which point Schmitt inverters 121 and 122 change states and capacitor 124 begins to charge. The voltage on capacitor 124 increases until it reaches the positive-going threshold of Schmitt inverter 125, at which point Schmitt inverters 125, 126, 127 and 128 change states and the signal propagates through and generates reset signals RS2 and RS2-1 through RS2-12 as shown in FIG. 3, and capacitor 132 begins to charge. The voltage on capacitor 132 increases until it reaches the positive-going threshold of Schmitt inverter 133, at which point the signal propagates through and generates reset signal RS3 of FIG. 3.

In the preferred embodiment, capacitors 116 and 124 are selected to be of equal capacitance and capacitor 132 is selected to be of lesser capacitance than capacitors 116 and 124. Resistors 117, 119 and 131 are selected to be of equal resistance. The resistance and capacitance values of FIG. 3 set the well-known RC time constants that determine the time delays of the output reset signals of FIG. 3. The RC time constants are selected to generate sufficient time delays to enable the microprocessor to execute an initialization routine, a portion of which sets all votes to no before reset signal RS3 ends, thereby preventing spurious yes votes from being received by majority vote combination circuitry 22. In other embodiments the resistor and capacitor values are varied to provide alternative time constants and associated time delays, such alternative time delays being within the range of time delays that are sufficient to enable the microprocessor to perform the initialization function described above.

As illustrated in FIG. 2, reset signals RS2 and RS3 are applied to open collector logic gate 256, and, for example, reset signal RS2-1 is applied to open collector logic gates 260A. Reset signal RS1 of reset circuits 207A, 207B and 207C resets the microprocessors which begin executing the initialization program contained in the PROM of memory 202A, 202B and 202C of sequencers 12A, 12B and 12C, respectively, of first sequencer group 25. The sequencers (not shown in FIG. 2) in second sequencer group 25B of FIG. 1 similarly begin execution of the initialization programs contained in their respective memories. The delay between RS1 and the subsequent reset signals (RS2, RS2-1 through RS2-12 and RS3) is chosen to give the microprocessors adequate time to initialize the votes (all votes no) presented to majority vote combination circuitry 22. The AND inputs of open collector logic gates 256 and 260A, 260B and 260C and relay 257, the operation of which is described above, prevent output signals from reaching the devices to be sequenced prematurely.

Referring to FIG. 3, application of a positive Master Reset signal or a positive Program Reset signal causes opto-isolator 115 to discharge capacitors 116, 124 and 132. These discharges reduce the voltage on capacitors 116, 124 and 132 to ground potential which propagates through to reset signals RS1, RS2, RS2-1 through RS2-12, and RS3, setting them to a low logic level. When the positive Master Reset signal or positive Program Reset is removed, the outputs of opto-isolator 115 return to a high impedance state. The capacitors then begin to charge as in the power-up situation described above. As illustrated in FIG. 2, logic low levels of RS2, RS2-1 through RS2-12 and RS3 reset signals prevent output signals from activating the devices to be sequenced. If a change in the system sequence is desired a Program Reset signal 102 is applied. Command signals are then utilized to initiate the execution of the programs in the PROMs of the sequencer 12A, 12B and 12C which direct the modification of the contents of the EAROM.

After power-up and removal of any Master Reset or Program Reset signals, the microprocessors in the sequencers of both groups begin executing the programs contained in the PROM of each sequencer as soon as RS1 goes high. The clock references, for example clock references 205A, 205B and 205C of FIG. 2, of all sequencers operate to within a predetermined variation of the same frequency so that all of the microprocessors in first and second sequencer groups 25 and 25A execute the programs at nearly the same rate. Control signals can be used to transfer execution from the initialization program to the sequence program stored in the EAROMs of the sequencers. In the preferred embodiment, the sequencers of both first and second sequencer groups 25 and 25A are identical and the EAROMs contain the same sequence program. Because each of first and second sequencer groups controls up to thirty-two different devices, the sequence timing data in the EAROMs is not the same for the two groups. The timing data for the two groups reflects the different timing requirements for each of the devices controlled by each group.

During execution of the sequencer programs, external devices (not shown) may communicate with the sequencers via control signals, such as illustrated by control signals 232A, 234A, 232B, 234B, 232C and 234C (of FIG. 2). The control signals are used by the external devices to initiate various sequencer operating modes which include program (i.e., alter EAROM contents) and inhibit (i.e., suspend execution of the sequencer program). In other embodiments, control signals initiate self-diagnostic testing programs and provide for the monitoring of the sequencing system status by external devices. In the preferred embodiment, the EAROMs of the sequencers can contain data for up to four possible sequences. External devices (not shown) use control signals to select which of the up to four sequences are to be executed by the sequencer. This configuration provides flexibility in that a sequence change can be made by using control signals to select one of up to four sequences instead of altering the EAROM contents. In other embodiments additional EAROM memory and control signals are provided for storage of more than four possible sequences.

After the appropriate control signals have been applied, the sequence programs located in the EAROM of each sequencer are executed. The microprocessors use the sequence data to write to the I/O portions of the peripheral circuits that are configured as outputs. This operation constitutes voting on the status of the devices to be sequenced. In the preferred embodiment, these votes are cast solely as a function of elapsed time and the sequence program being executed. The timing of the votes is derived from the clock reference resonant frequency, the sequence program, and the programmable timer/counter portions of the peripheral circuits.

Referring to FIG. 1, the thirty-two votes of each sequencer of first and second sequencer groups 25 and 25A are presented to majority vote combination circuitry 22. As illustrated in FIG. 2, the corresponding votes of each group are combined to yield thirty-two sets of partial votes with three partial votes in each set. Also as illustrated in FIG. 2, the three partial votes of a set are no until at least two of the three corresponding votes are yes. If two of the three corresponding votes are yes, one partial vote will be yes. If all three corresponding votes are yes, all three partial votes will be yes. During sequence execution, the partial votes change in response to the votes which are being "cast" at periodic intervals by the sequencer microprocessors. Yes partial votes activate the relays that apply power to the devices to be sequenced, thereby implementing the desired sequence.

A failure of a single sequencer in a group of identically operating sequencers will not disrupt the desired sequence. An erroneous no vote, such as might occur if one sequencer in a group fails to operate properly, will not prevent at least one partial vote from being yes because the remaining two sequencers of the group will vote yes if they operate properly. The effect of an erroneous yes vote will not result in any yes partial votes because two yes votes are needed to produce a yes partial vote.

In the event of an erroneous no vote, an analysis of the partial votes indicates which of the sequencers is producing the erroneous vote. Referring to FIG. 2, open collector logic gate 260A receives a single corresponding vote from sequencer 12A and 12B, open collector logic gate 260B receives a single corresponding vote from sequencers 12A and 12C, and open collector logic gate 260C receives a single corresponding vote from sequencers 12B and 12C. If two of the corresponding votes are yes while the remaining vote is no, then only one partial vote will be yes. The two sequencers that produce the yes partial vote are the sequencers that are operating properly. For example, if the partial vote of open collector logic gate 260B of FIG. 2 is the only yes partial vote, (i.e., only partial vote A & C is yes) then sequencer 12B is generating the erroneous no vote.

The experience of the inventors indicates that most failure modes result in erroneous no votes. Accordingly, in the preferred embodiment, an analysis of the partial votes will indicate only erroneous no votes. Circuitry complementary to gates 260A, 260B and 260C and known in the art is also provided in alternative embodiments to determine which sequencer is generating an erroneous yes vote in a manner analogous to that described above for erroneous no votes. In still further alternative embodiments, analysis of the votes applied to logic gates 260A, 260B and 260C of FIG. 2 directly indicates which sequencer is generating an erroneous yes or no vote.

While the preferred embodiment of the invention has been illustrated and described, it is to be understood that the invention is not limited to the precise construction herein disclosed, and the right is reserved to all changes and modifications coming within the scope of the invention as defined in the appended claims.

What is claimed is:

1. A sequencer apparatus for controlling the timing and sequence in which a plurality of devices are electrically activated, comprising:
   a plurality of sequencer means wherein each of said sequencer means sequentially generates at least one vote output signal having first and second states, wherein each of said vote output signals generated by each of said sequencer means corresponds to a vote output signal generated by each of the other of said sequencer means, and wherein each vote output signal generated by each of said sequencer means corresponds to at least one of the devices;
   combining means for combining all of the corresponding vote output signals from said plurality of sequencer means, each vote output signal being paired with each of the other corresponding vote output signals, said combining means generating one partial vote signal derived from each pair of corresponding vote output signals, a partial vote signal being in the first state when both vote output signals in the pair from which it is derived are in the first state, and a partial vote signal being in the second state when both vote output signals in the pair from which it is derived are not in the first state; and
   a plurality of activating means responsive to the partial vote signals for activating the plurality of devices, at least one of said activating means corresponding to each of the devices, each of said activating means receiving only the partial vote signals derived from corresponding vote output signals, each of said activating means activating the device to which it corresponds when at least one partial vote signal received by it is in the first state.

2. The apparatus as claimed in claim 1 wherein said apparatus further comprises reset means for generating a first reset signal for simultaneously initializing each of said plurality of sequencer means.

3. The apparatus as claimed in claim 2 wherein said reset means also generates a second reset signal to inhibit, for a predetermined time, said combining means from generating any partial vote signals that are in the first state.

4. The apparatus as claimed in claim 3 wherein said reset means also generates a third reset signal to inhibit, for a predetermined time, each of said activating means from activating the plurality of devices.

5. The apparatus as claimed in claim 4 wherein said apparatus further comprises means for generating an external reset signal, wherein said reset means generates the first reset signal in response to the external reset signal and generates the second and third reset signals for first and second predetermined delay periods, respectively, after generating the first reset signal.

6. The apparatus in claim 5 wherein the second predetermined delay period is shorter than the third predetermined delay period.

7. The apparatus as claimed in claim 4 wherein no devices are activated until after each of said plurality of sequencer means and said combining means have commenced steady state operation.

8. The apparatus as claimed in claim 3 wherein no partial vote signals are in the first state until after each of said plurality of sequencer means has commenced steady state operation.

9. The apparatus as claimed in claim 1 wherein each of said plurality of sequencer means further comprises:
memory means for storing a sequence and timing program;
clock means for generating clock signals at a predetermined frequency; and
microprocessor means responsive to the clock signals for executing the sequence and timing program so that at least one vote output signal is generated in a first state or a second state at any given time as determined by the sequence and timing program.

10. The apparatus as claimed in claim 9 wherein the predetermined frequency of said clock is the same for all of said sequencer means, and wherein all of the corresponding vote output signals are generated by said sequencer means synchronously.

11. The apparatus as claimed in claim 9 wherein said memory means for storing the sequence and timing program is comprised of electrically alterable memory means, so that said sequence and timing program can be electrically altered to change the timing of when each vote output signal is in the first state.

12. The apparatus as claimed in claim 1 wherein at least one of said activating means receives partial vote signals, said partial vote signals being derived from two different groups of corresponding vote output signals, so that said activating means activates the corresponding device when at least one partial vote signal from either group is in the first state.

13. The apparatus as claimed in claim 1 wherein at least one of said activating means receives partial vote signals, said partial vote signals being derived from two different groups of corresponding vote output signals, so that said activating means activates the corresponding device when at least one partial vote signal from each of said groups is in the first state at a given time.

14. The apparatus as claimed in claim 1 wherein at least two of said activating means are connected in series and both control at least one common device, so that the common device is not activated unless at least two partial vote signals are in the first state at a given time, said partial vote signals being derived from both of two different groups of corresponding vote output signals.

15. The apparatus as claimed in claim 1 wherein at least two of said activating means are connected in parallel and both control at least one common device, so that the common device is activated when at least one partial vote signal is in the first state, said partial vote signal being derived from either of two different groups of corresponding vote output signals.

16. The apparatus as claimed in claim 1 wherein said plurality of sequencer means are arranged in at least one group of three of said sequencer means, and wherein said combining means combines the vote output signal from each of the three said sequencer means with the vote output signal of each of the other two of the three said sequencer means to produce three corresponding partial vote signals.

17. The apparatus as claimed in claim 1 wherein said combining means further comprises a plurality of open collector logic gate circuits, each of said open collector logic gate circuits adapted to receive at least two corresponding vote output signals and to generate a partial vote signal.

18. The apparatus as claimed in claim 1 wherein each partial vote signal in the first state constitutes a source of electrical power for energizing at least one of said activating means.

19. The apparatus as claimed in claim 1 wherein said activating means comprises relay switches.

* * * * *

UNITED STATES PATENT AND TRADEMARK OFFICE
CERTIFICATE OF CORRECTION

PATENT NO. : 4,799,140
DATED : January 17, 1989
INVENTOR(S) : Ronald P. DIETZ, et al.

It is certified that error appears in the above—identified patent and that said Letters Patent is hereby corrected as shown below:

In the Description of the Preferred Embodiment:

Column 3, Line 57; "an" should be -- on -- and,

Column 11, Line 21; "RS2-2" should be -- RS2-1 --.

Signed and Sealed this

Twentieth Day of June, 1989

Attest:

DONALD J. QUIGG

Attesting Officer

Commissioner of Patents and Trademarks